Sept. 17, 1935.   J. T. NEEDHAM   2,014,447

BELT CONVEYER

Filed Oct. 28, 1932   2 Sheets-Sheet 1

Inventor
JOHN T. NEEDHAM

By *David Davis*

Attorneys

Sept. 17, 1935. J. T. NEEDHAM 2,014,447
BELT CONVEYER
Filed Oct. 28, 1932 2 Sheets-Sheet 2
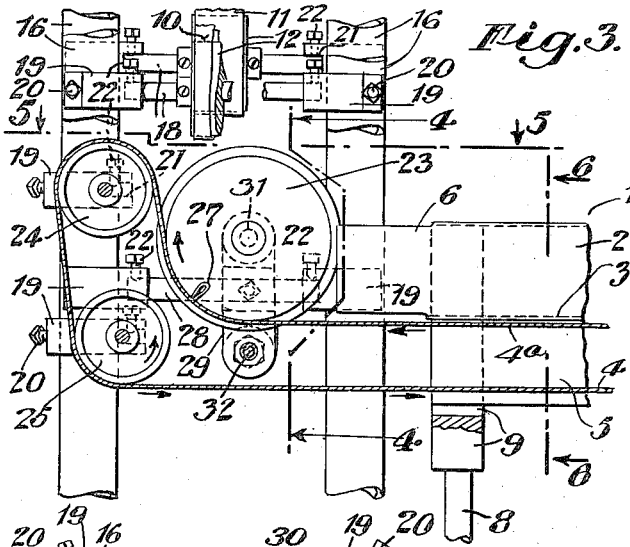
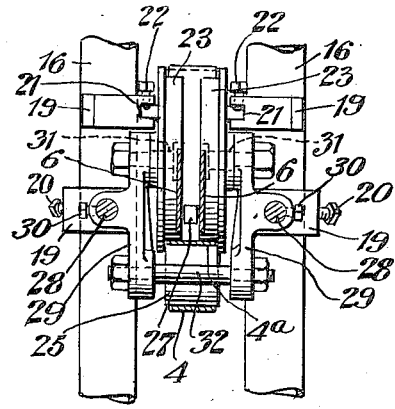
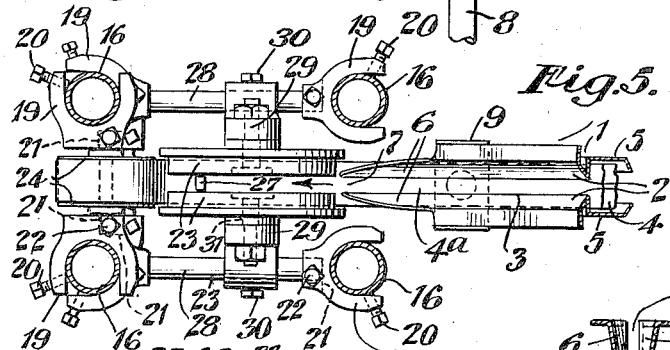
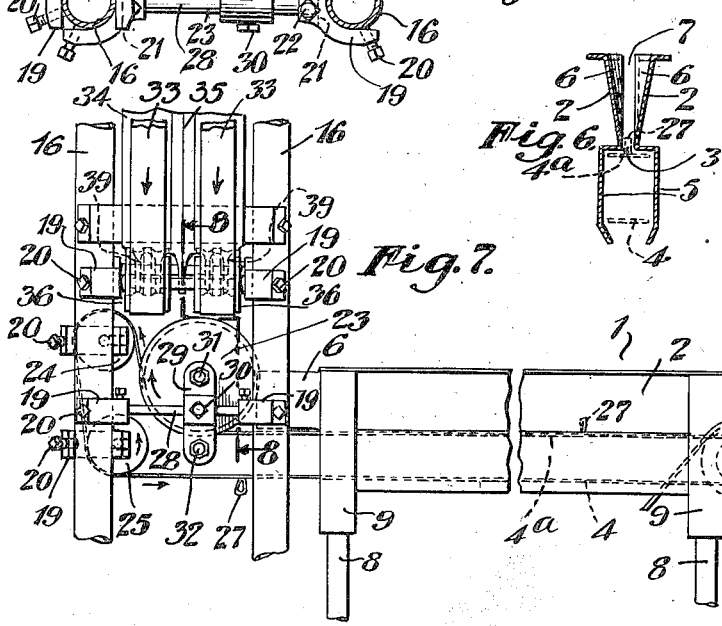
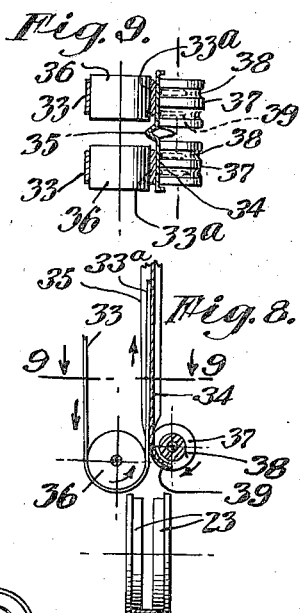
Inventor
JOHN T. NEEDHAM
By
Attorneys Patented Sept. 17, 1935

2,014,447

UNITED STATES PATENT OFFICE 2,014,447

BELT CONVEYER

John T. Needham, North Plainfield, N. J.

Application October 28, 1932, Serial No. 639,981

28 Claims. (Cl. 198—165)

This invention relates more particularly to belt conveyers for conveying sheets, such as telegram sheets, for example. An important object of the invention is to provide an improved delivery juncture between a laterally running conveyer feed line and an ascending conveyer pick-up line.

Other objects of the invention will appear hereinafter.

In the drawings, Fig. 1 is an elevation of a belt conveyer system embodying the invention, looking toward one side of the pick-up line;

Fig. 3 is an enlarged section approximately on the line 3—3 of Fig. 1;

Fig. 4 is a section on the line 4—4 of Fig. 3;

Fig. 5 is a section on the line 5—5 of Fig. 3;

Fig. 6 is a section on the line 6—6 of Fig. 3;

Fig. 7 is a partial side elevation similar to Fig. 2, showing the invention embodied in a belt conveyer system having an ascending pick-up conveyer line of the drag type;

Fig. 8 is a diagrammatic section on the line 8—8 of Fig. 7; and

Fig. 9 is a section on the line 9—9 of Fig. 8.

Figure 1:
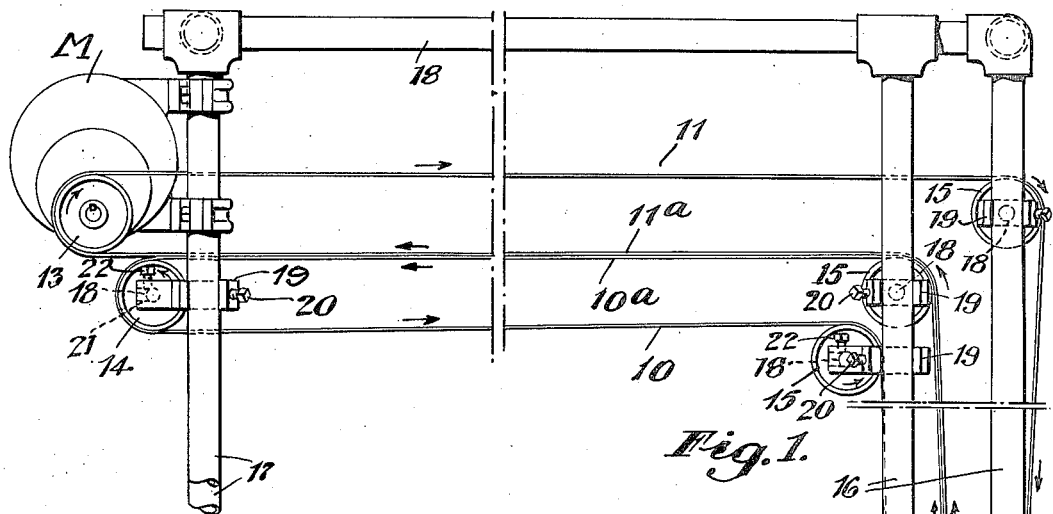
Figure 2:
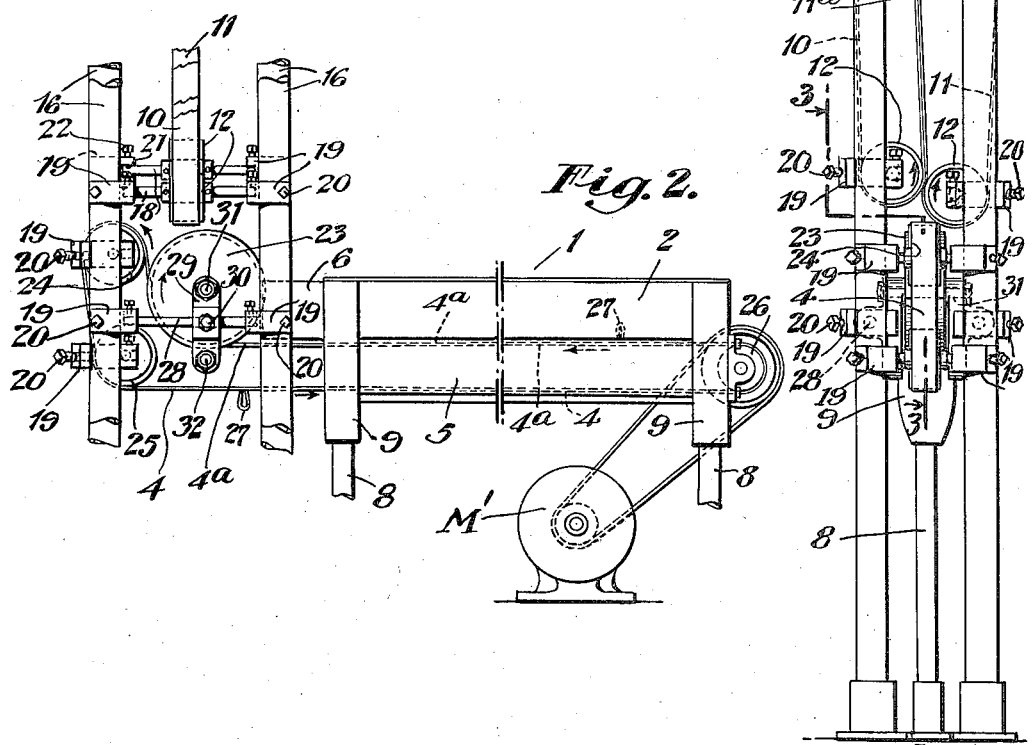
Fig. 2 is an elevation of a portion of said conveyer system, looking toward one side of the laterally running feed line.

In Figs. 1 to 6 inclusive, the invention is shown embodied in a belt conveyer system including a laterally running feed line and a pick-up line having an ascending reach and an overhead lateral reach. Between the feed line and said ascending reach of the pick-up line I have provided an improved delivery juncture to receive sheets edgewise from the feed line and deliver them edgewise to the pick-up line without interruption. This juncture is designed to prevent escape of the conveyed sheets between said lines and also prevent crumpling of the sheets as they are passed from one line to the other. It includes twin pulleys spaced apart to define a sheet passage between them, and a single conveyer belt running on both pulleys to convey the sheets through said passage, as will be described fully hereinafter.

The laterally running feed line is of a well-known type including a narrow horizontal trough 1 having downwardly converging side walls 2. At their lower edges said walls are spaced apart to define a narrow slot 3. Beneath the trough there is a conveyer belt 4 materially wider than said slot and having a conveyer reach 4ᵃ directly underlying the slot. The sides of the trough preferably have extensions 5 forming a housing for the belt. Sheets are dropped into the trough at any point therealong and are held approximately upright, with their lower edges in contact with the belt. Thereby the sheets are supported and guided by the trough for edgewise conveyance. At the discharge end of the trough the sides 2 are formed with extensions 6, defining a narrow vertical exit slot 7 with parallel sides. The sheets are discharged through this slot to the delivery juncture between the lines. The trough is supported in any suitable manner, as by standards 8 bearing forks 9 in which the trough is fitted and secured. The pick-up line includes two conveyer belts 10 and 11 trained continuously along the ascending reach and the overhead lateral reach of the line. The belts are trained by two pulleys 12 at the receiving end of the line, two pulleys 13 and 14 at the discharge end of the line, and three intermediate pulleys 15 at the juncture of the ascending reach and the overhead lateral reach. Said pulleys train the belts 10 and 11 to provide two conveyer reaches 10ᵃ and 11ᵃ disposed in face to face contact to grip the sheets therebetween and convey them along the line. At the receiving end of the line the pulleys 12 train the belts to define a downwardly opening V-shaped mouth through which the sheets enter the line.

The pulleys of the pick-up line are supported by a skeleton frame including four stanchions 16. They define an open column for the ascending reach of the line and support the pulleys 12 and 15. The pulleys 13 and 14 at the discharge end of the line are supported on a pair of spaced tubular stanchions 17 connected to the stanchions 16 by tubular beams 18. An electric motor M is mounted on the stanchions 17 and the pulley 13 is fixed to the motor shaft to drive the belt 11. The belt 10 is driven by the belt 11, through the contact of the reach 11ᵃ with the reach 10ᵃ. For convenience in illustration, the pick-up line is shown as terminating at the stanchions 17. It may, however, lead to any suitable discharge point.

The pulleys 12, 14 and 15 are mounted on the frame in a manner to facilitate their installation and removal. The mounting of each pulley includes a shaft 18 and a pair of forked supporting brackets 19 for the shaft. The brackets straddle the supporting stanchions and are releasably and adjustably fastened thereto by set screws 20 on the brackets. The brackets have recesses 21 receiving the shaft ends. Said recesses are open at one side, and the shaft ends are held therein by set screws 22 on the brackets. This mounting structure enables the brackets to be readily applied or removed transversely of the stanchions and also enables the shaft to be readily mounted or removed transversely without disturbing the brackets. The pulleys are rotatable on the shafts and are held against endwise shift by any suitable means.

The delivery juncture between the feed line and pick-up line includes a pair of pulleys 23 of the same diameter, mounted coaxially and axially spaced apart. Preferably the diameter of said pulleys materials exceeds the depth of the trough 1, and the pulleys are flanged at their outer sides. The opposed faces of the pulleys are preferably flat and smooth and they define therebetween a narrow passage for the conveyed sheets. Said passage is in receiving register with the exit slot 7 of the trough 2. The trough extensions 6 defining the slot 7 extend quite close to the peripheries of the pulleys and the width of the slot is equal to or slightly less than that of the passage between the pulleys, so that sheets from the feed line will enter the passage without possibility of escape and without striking the peripheries of the pulleys. At the upper side of the pulleys the passage is in delivery register with the downwardly opening entry mouth of the pick-up line and disposed quite close to it.

To convey sheets from the laterally running feed line to the ascending pick-up line of the conveyor, belt reach 4ª of the feed line is trained around the under side of the pulleys 23 and upward around a pulley 24 whose axis is located above that of the pulleys 23. Belt 4 is materially wider than the space between pulleys 23 and it engages the peripheries of both pulleys to drive them. It closes said space, at the under side of the pulleys and at the side thereof diametrically opposite the discharge end of the feed line, so that the sheets cannot escape from the delivery juncture.

The feed line belt 4 is trained by two pulleys 25 and 26 in addition to the pulley 24. Pulleys 24 and 25 are mounted on two of the stanchions 16 in a manner similar to the mounting of pulleys 12. The feed line belt and the pulleys 23 are driven by an electric motor M' having a driving connection with pulley 26. To insure positive propulsion of the sheets along the feed line and through the delivery juncture, the feed line belt is provided with one or more upstanding pick-up projections 27. The latter are preferably flexible and resilient, and they are just narrow enough to pass through the trough bottom slot 3, the exit slot 7 and the passage between the pulleys 23.

Sheets dropped into the feed line trough are conveyed edgewise, in substantially upright position, along the trough, through the exit slot 7 and into the passage between the pulleys 23. Here they are kept upright by the pulleys and are tossed upward into the mouth of the pick-up line by the upwardly trained portion of the belt reach 4ª and by the spinning pulleys 23 whose opposed faces engage the sheets. Sheets which tend to cling anywhere along the trough or in the delivery juncture are dislodged by the pick-up projections 27 and positively propelled.

The pulleys 23 are mounted for adjustment into accurate delivery relation to the pick-up line. Their mounting includes two supporting rods 28 at the opposite sides thereof. These rods are supported in the same manner as the pulley shafts, by forked brackets 19 straddling the stanchions 16. A bearing plate 29 is slidably mounted upon each rod 28 and has a set screw 30 to lock it to the rod. Each bearing plate has a stub shaft 31 fixed thereto to rotatably support one of the pulleys. At their inner ends said stub shafts have heads countersunk in the flat faces of the pulleys so that they leave the sheet passage between the pulleys unobstructed throughout the entire diameter of the pulleys. At their outer ends the stub shafts have reduced threaded ends extending through the bearing plates and held thereto by nuts. Beneath the pulleys the bearing plates are connected by a spacing rod 32. The latter also has reduced threaded ends extending outward through the bearing plates and rigidly held thereto by nuts. When the setscrews 30 are released the bearing plates 29 may be slid along the rods 28 and since the shafts of the two pulleys are held in a fixed yoke including the bearing plates and the spacing rod 32, the pulleys are thereby adjustable horizontally in unison toward and from the feed line. They are also adjustable vertically in unison by releasing the setscrews 20 of the forked brackets 19 and shifting the latter vertically along the stanchions 16.

In Figs. 7, 8 and 9 the delivery juncture is shown embodied in a belt conveyer system wherein the pick-up line is of the twin drag belt type disclosed in my co-pending application Serial No. 512,914, filed February 2, 1931. The pick-up line includes a pair of parallel companion conveyer belts 33 driven at the same speed and in the same direction. Opposed to the ascending conveyer reaches 33ª of said belts there is a flat shield or sheet guide 34 along which the belts drag the sheets. Said shield has a longitudinal ridge 35 projecting outward between the belt reaches 33ª. Sheets are engaged by both of said belt reaches for conveyance and the medial portion of each sheet is flexed outward between the belts by said ridge. Thereby the sheets are held against transverse displacement from beneath the belts.

At the receiving end of the pick-up line the twin belts 33 are trained around twin pulleys 36. Opposed to said pulleys are rollers 37. These rollers have peripheral grooves 38. The receiving end of the shield 34 has curved prongs 39 which extend into said grooves, and the portions of the rollers 37 between the grooves form ribs which project outward from between the prongs to engage the belts. Thereby there is formed a substantially V-shaped entry mouth for the pick-up line. The sheet passage between the pulleys 23 of the delivery juncture is disposed in delivery register with said mouth. The rollers 37 are driven through their contact with the belts 33 and cooperate with the latter to seize the sheets as they are delivered upward into the mouth and guide them between the belt reaches 33ª and the shield 34 for conveyance along the latter. The ridge 35 is extended below the body of the shield and curved to project between the rollers 37 and guide the delivered sheets onto the ridge.

What I claim is:

1. In a sheet conveyer system including a pick-up conveyer line and a feed conveyer line extending toward a receiving point of the pick-up line, a delivery juncture between said lines comprising a pair of pulleys coaxially mounted and axially spaced apart to define a sheet passage therebetween in receiving register with the feed line and in delivery register with the pick-up line, and a conveyer belt overlapping the peripheries of both of said pulleys and trained around one side thereof and toward said receiving point of the pick-up line, to convey sheets edgewise through said passage between the feed line and the pick-up line.

2. In a sheet conveyer system including a pick-up conveyer line and a feed conveyer line extending toward a receiving point of the pick-up line, a delivery junction between said lines comprising a pair of pulleys coaxially mounted and axially spaced apart to define a sheet passage therebetween in receiving register with the feed line and in delivery register with the pick-up line, a conveyer belt overlapping the peripheries of both of said pulleys and trained around one side thereof and toward said receiving point of the pick-up line, to convey sheets edgewise through said passage between the feed line and the pick-up line, and means to guide the sheets edgewise from the feed line into said passage.

3. In a belt sheet conveyer system including an ascending pick-up conveyer line and a laterally running feed line leading to the lower end of the pick-up line, a delivery juncture between said feed line and pick-up line comprising a pair of pulleys coaxially mounted and axially spaced apart to provide a sheet passage therebetween in receiving register with the feed line and in delivery register with the pick-up line, and a conveyer belt overlapping the peripheries of said pulleys and trained around the under side thereof and upward toward the pick-up line, to convey sheets edgewise through said passage between the feed line and the pick-up line.

4. In a belt sheet conveyer apparatus including an ascending pick-up conveyer line, a conveyer feed line comprising a belt having a conveyer reach running laterally toward the lower end of said pick-up line, and sheet guiding and supporting means extending along said belt reach to support sheets approximately upright and with their lower edges in contact with the belt reach; and a delivery juncture between said feed line and said pick-up line comprising a pair of pulleys coaxially mounted and axially spaced apart to provide a sheet passage therebetween in receiving register with said sheet guiding and supporting means and in delivery register with the lower end of said pick-up line, and a belt reach formed by a continuation of said feed line belt reach overlapping the peripheries of both of said pulleys and trained around the under side thereof and upward toward the pick-up line, to convey sheets edgewise through said passage between the feed line and the pick-up line.

5. In a sheet conveyer system including a pick-up conveyer line and a feed conveyer line extending toward a receiving point of the pick-up line, a delivery juncture between said lines comprising a pair of pulleys coaxially mounted and axially spaced apart to define a sheet passage therebetween in receiving register with the feed line and in delivery register with the pick-up line, a conveyer belt overlapping the peripheries of both of said pulleys and trained around one side thereof and toward said receiving point of the pick-up line, to convey sheets edgewise through said passage between the feed line and the pick-up line, and means to adjust said pulleys into accurate cooperative relation to said conveyer lines.

6. In a sheet conveyer system including a pick-up conveyer line and a feed conveyer line extending toward a receiving point of the pick-up line, a delivery juncture between said lines comprising a pair of pulleys coaxially mounted and axially spaced apart to define a sheet passage therebetween in receiving register with the feed line and in delivery register with the pick-up line, a conveyer belt overlapping the peripheries of both of said pulleys and trained around one side thereof and toward said receiving point of the pick-up line, to convey sheets edgewise through said passage between the feed line and the pick-up line, and means to adjust said pulleys in unison into accurate cooperative relation to said conveyer lines.

7. In a sheet conveyer system including a pick-up conveyer line and a feed conveyer line extending toward a receiving point in the pick-up line, a delivery juncture between said lines comprising a pair of pulleys coaxially mounted and axially spaced apart to define a sheet passage therebetween in receiving relation to the feed line and in delivery relation to the pick-up line, and a conveyer belt overlapping the peripheries of both pulleys and trained around one side thereof and toward the receiving point of the pick-up line, to convey sheets edgewise through said passage between the feed line and the pick-up line, the space between said pulleys being open throughout the full diameter of the opposed faces of the pulleys.

8. In combination, a sheet conveyer line; and feeding means for said line comprising a pair of pulleys coaxially mounted and axially spaced apart to define a sheet passage therebetween in delivery relation to a receiving point of said conveyer line, and a conveyer belt overlapping the peripheries of both of said pulleys and trained around one side thereof and toward said receiving point of the conveyer line to deliver sheets edgewise through said passage to said receiving point.

9. In combination, a sheet conveyer line, a pair of pulleys coaxially mounted and axially spaced apart to define a sheet passage therebetween in receiving relation to said conveyer line, and a conveyer belt overlapping the peripheries of both of said pulleys and trained around one side thereof and then away therefrom at an angle to said conveyer line, to convey sheets edgewise from the line through said passage and discharge them in a direction at an angle to the line.

10. In combination, a sheet conveyer line; and feeding means for said line comprising a pair of pulleys coaxially mounted and axially spaced apart to define a sheet passage therebetween in delivery relation to a receiving point of said conveyer line, a conveyer belt overlapping the peripheries of both of said pulleys and trained around one side thereof and toward said receiving point of the conveyer line to deliver sheets edgewise through said passage to said receiving point, and means to deliver the sheets edgewise into said passage.

11. In combination, a sheet conveyer line; and feeding means for said line comprising a pair of pulleys coaxially mounted and axially spaced apart to define a sheet passage therebetween in delivery relation to a receiving point of said conveyer line, a conveyer belt overlapping the peripheries of both of said pulleys and trained around one side thereof and toward said receiving point of the conveyer line to deliver sheets edgewise through said passage to said receiving point, and a mounting for said pulleys supporting them in fixed relation to each other and rendering them adjustable in unison with reference to said receiving point.

12. In combination, a sheet conveyer line; and feeding means for said line comprising a pair of pulleys coaxially mounted and axially spaced apart to define a sheet passage therebetween in delivery relation to a receiving point of said conveyer line, a conveyer belt overlapping the peripheries of both of said pulleys and trained around one side thereof and toward said receiving point of the conveyer line to deliver sheets edgewise through said passage to said receiving point, and means to adjust said pulleys longitudinally of the conveyer line and transversely thereof to position them in accurate delivery relation to said receiving point of the line.

13. In combination, a laterally running belt sheet conveyer line comprising a belt having a conveyer reach along the line and sheet guiding and supporting means extending along said belt reach to support sheets approximately upright and with their lower edges in contact with the belt reach for conveyance thereby, a pair of pulleys at the delivery end of the line coaxially mounted and axially spaced apart to define a sheet passage therebetween in receiving register with said sheet guiding and supporting means, and a belt reach formed by a continuation of said feed line belt reach overlapping the peripheries of both of said pulleys and trained around the under side thereof and upward at an angle to the said conveyer line, to convey sheets edgewise from the line through said passage and discharge them upward.

14. In combination, an ascending belt sheet conveyer line comprising belts trained to provide cooperating opposed conveyer reaches to grip sheets therebetween and convey them up the line and trained at the lower end of the line to form an approximately V-shaped entry mouth opening downward, a pair of pulleys coaxially mounted and axially spaced apart to define a sheet passage therebetween, located below said mouth and in delivery register therewith and opening upward toward it, a conveyer belt overlapping the peripheries of both of said pulleys and trained around the under side thereof and upward, to convey sheets edgewise through said passage and discharge them upward edgewise into said mouth, and means to feed the sheets edgewise into said passage in a lateral direction.

15. In combination, an ascending drag belt sheet conveyer line comprising a belt having an ascending conveyer reach, and a sheet guide extending along said reach to hold sheets thereto for conveyance, said belt and sheet guide defining an approximately V-shaped downwardly opening entry mouth at the lower end of the line, and a pair of pulleys coaxially mounted and axially spaced apart to define a sheet passage therebetween located below said mouth and in register with it and opening upward toward it, a conveyer belt overlapping the peripheries of both of said pulleys and trained around the under side thereof and upward, to convey sheets edgewise through said passage and discharge them upward into said mouth, and means to feed the sheets edgewise into said passage in a lateral direction.

16. In a belt sheet conveyer apparatus including an ascending pick-up conveyer line, a conveyer feed line comprising a belt having a conveyer reach running laterally toward the lower end of said pick-up line, and sheet guiding and supporting means extending along said belt reach to support sheets approximately upright and with their lower edges in contact with the belt reach; and a delivery juncture between said feed line and said pick-up line comprising a pair of pulleys coaxially mounted and axially spaced apart to provide a sheet passage therebetween in receiving register with said sheet guiding and supporting means and in delivery register with the lower end of said pick-up line, a belt reach formed by a continuation of said feed line belt reach overlapping the peripheries of both of said pulleys and trained around the under side thereof and upward toward the pick-up line, to convey sheets edgewise through said passage between the feed line and the pick-up line, and a pick-up projection on said feed line belt to positively propel the sheets along the feed line and through the passage between the pulleys.

17. In combination, a sheet conveyer line; and feeding means for said line comprising a pair of pulleys coaxially mounted and axially spaced apart to define a sheet passage therebetween in delivery relation to a receiving point of said conveyer line, a conveyer belt overlapping the peripheries of both of said pulleys and trained around one side thereof and toward said receiving point of the conveyer line to deliver sheets edgewise through said passage to said receiving point, and a pick-up projection on said belt to positively propel the sheets through said passage.

18. In a conveyer system including an ascending pick-up conveyer line and a feed conveyer line running laterally toward a receiving point of said pick-up line, a delivery juncture between said conveyer line comprising a pair of power driven rotors mounted in spaced side-by-side relation to define between their opposed side faces a passage for conveyed articles, said passage being disposed in receiving relation to the feed line and in delivery relation to the pick-up line, and power driven means cooperable with said rotors to convey articles through said passage and toss them upward into the pick-up line.

19. In a conveyer system including an ascending pick-up conveyer line and a feed conveyer line running toward a receiving point of said pick-up line, a delivery juncture between said conveyer lines comprising a pair of power driven rotors mounted in spaced side by side relation to define between their opposed side faces a passage for conveyed articles said passage being disposed in receiving relation to said feed line and in delivery relation to said pick-up line, and belt conveyer means trained to cooperate with said rotors to convey articles received from the feed line through said passage and toss them upward into the pick-up line.

20. In a sheet conveyer system including an ascending pick-up conveyer line to convey sheets edgewise and substantially upright and having a downwardly facing entrance for edgewise reception of sheets into the line, and a feed conveyer line running laterally toward said entrance of the pick-up line to convey sheets edgewise and substantially upright, a delivery juncture between said lines comprising sheet guiding and supporting means to support a sheet substantially upright and form a passage for edgewise travel of the sheet therethrough between the feeder line and said entrance of the pick-up line, said passage opening toward the feeder line and also opening upward toward said entrance of the pick-up line, and belt conveyer means trained to convey the sheet edgewise through said passage and toss in upward edgewise into said pick-up entrance.

21. In a sheet conveyer system including an ascending pick-up conveyer line to convey sheets edgewise and substantially upright and having a downwardly facing entrance for edgewise reception of sheets into the line, and a feed conveyer line running laterally toward said entrance of the pick-up line to convey sheets edgewise and substantially upright, a delivery juncture between said lines comprising sheet guiding and supporting means to support a sheet substantially upright and form a passage for edgewise travel of the sheet therethrough between the feed line and said entrance of the pick-up line, said passage opening toward the feed line and upward toward said entrance of the pick-up line, and conveyer means to convey the sheet edgewise through said passage and toss it upward edgewise into said pick-up line entrance.

22. In a sheet conveyer system including an ascending pick-up conveyer line and a feed conveyer line running laterally toward said pick-up line, a sheet delivery juncture between said lines comprising sheet-guiding and supporting means to support a sheet substantially upright and forming a narrow passage for travel of a sheet edgewise therethrough between the feed line and the pick-up line, and belt conveyer means trained to convey the sheet edgewise through said passage and discharge it upward edgewise into the pick-up line.

23. In combination, an ascending sheet conveyer pick-up line to convey sheets edgewise and substantially upright; a sheet conveyer feed line to convey sheets edgewise and substantially upright and running laterally toward a receiving point of said pick-up line; and a sheet delivery juncture between said lines including sheet-guiding and supporting means and power driven conveyer means cooperable therewith to deliver sheets edgewise and substantially upright from the feed line to the pick-up line, said lines and said delivery juncture between the lines being cooperable for uninterrupted conveyance of sheets edgewise along the lines and from line to line through the delivery juncture.

24. A sheet conveyer system comprising an ascending pick-up conveyer line to convey sheets edgewise and having a downwardly opening entrance for edgewise reception of sheets into the line; a feed conveyer line running at an angle to the pick-up line toward said entrance of the latter to convey sheets edgewise; and a delivery juncture between said conveyer lines comprising sheet guiding means and power driven conveyer means cooperable with said sheet guiding means to deliver a sheet edgewise from the feed line to said entrance of the pick-up line, said conveyer lines and delivery juncture being constantly cooperable to move sheets without interruption in transit along the lines and from line to line and to support the sheets for travel edgewise in substantially the same plane along both lines and from line to line.

25. In a sheet conveyer system including a pick-up conveyer line having a downwardly facing entrance for edgewise reception of sheets into the line and a feed conveyer line running laterally toward said entrance of the pick-up line, sheet guiding and supporting means to laterally support sheets for conveyance edgewise and substantially upright along said feed line and to a point beneath said entrance of the pick-up line, and an ascending power-driven belt reach having a face thereof disposed in direct opposition to the approach of the sheets along the feed line to receive the sheets from the feed line edgewise against it and toss them upward edgewise into said entrance of the pick-up line, the feed line and said ascending belt reach being cooperable for uninterrupted conveyance of sheets edgewise along the feed line and into the pick-up line.

26. In a sheet conveyer system including a pick-up conveyer line having a downwardly facing entrance for edgewise reception of sheets into the line and a feed conveyer line running laterally toward said entrance of the pick-up line, sheet guiding and supporting means to laterally support sheets for conveyance edgewise and substantially upright along said feed line and to a point beneath said entrance of the pick-up line, and power driven impeller means constantly disposed in direct opposition to the approach of the sheets along the feed line to receive the sheets from the feed line edgewise against it and toss them freely upward edgewise into said entrance of the pick-up line, the feed line and said impeller means being cooperable for constant uninterrupted conveyance of sheets edgewise along the feed line and into the pick-up line.

27. An ascending sheet-conveyer line having a downwardly facing entrance for reception of sheets edgewise upward into the line, means to deliver sheets in one lateral direction edgewise to a point beneath said line entrance and support the delivered sheets substantially upright, and a power-driven belt trained to provide an ascending impeller reach with a face constantly disposed in direct opposition to the approach of the sheets delivered to said point beneath said line entrance to constantly receive the delivered sheets edgewise against said face and toss them freely upward edgewise into said entrance of the ascending line.

28. In a sheet-conveyer system including an ascending pick-up conveyer line having a downwardly facing entrance for reception of sheets edgewise upward into the line and a feed line running laterally toward said entrance of the pick-up line, sheet-guiding and supporting means to laterally support sheets for conveyance edgewise and substantially upright along the feed line and to a point beneath said entrance of the pick-up line, and power-driven impeller means constantly disposed in direct opposition to the approach of the sheets from the feed line to said point beneath said pick-up line entrance to receive the sheets edgewise against it and toss them freely upward into the pick-up line entrance, the feed line and said impeller means being cooperable for constant uninterrupted conveyance of sheets edgewise along the feed line and into the pick-up line.

JOHN T. NEEDHAM.